SELECTIVE SIGNALING APPARATUS FOR INFORMATION HANDLING DEVICE

Filed Feb. 24, 1964 3 Sheets-Sheet 1

INVENTOR
ROBERT E. BROADBRIDGE
BY Henry L. Hanson
ATTORNEY

March 21, 1967 R. E. BROADBRIDGE 3,310,664

SELECTIVE SIGNALING APPARATUS FOR INFORMATION HANDLING DEVICE

Filed Feb. 24, 1964 3 Sheets-Sheet 2

INVENTOR
ROBERT E. BROADBRIDGE
BY Henry L. Hanson
ATTORNEY

March 21, 1967 R. E. BROADBRIDGE 3,310,664

SELECTIVE SIGNALING APPARATUS FOR INFORMATION HANDLING DEVICE

Filed Feb. 24, 1964 3 Sheets-Sheet 3

INVENTOR
ROBERT E. BROADBRIDGE

BY Henry L. Hanson
ATTORNEY

United States Patent Office 3,310,664
Patented Mar. 21, 1967

3,310,664
SELECTIVE SIGNALING APPARATUS FOR INFORMATION HANDLING DEVICE

Robert E. Broadbridge, Needham, Mass., assignor to Honeywell Inc., a corporation of Delaware Filed Feb. 24, 1964, Ser. No. 346,970
9 Claims. (Cl. 235—159)

This invention relates to new and useful improvements in electronic digital computers and more particularly to apparatus for performing mathematical operations. More specifically, the present invention is concerned with a new and improved apparatus for generating selection signals in such a manner that the hardware and time required to thereby effect the selection of a plurality of memory words will be minimized.

In a copending application of William G. Daly, Jr. entitled, "Information Handling Device," Ser. No. 346,965, filed Feb. 24, 1964, there is disclosed a new and improved apparatus for manipulating numbers for use in performing a variety of mathematical operations including multiplication, division, conversion, extraction of square roots and the like. A preferred embodiment of the Daly invention is directed to multiplication in a digital computer by what is known as the multiple storage and selection technique. According to this technique, multiplication is effected by first generating multiples of a multiplicand and storing these, whereafter the digits of a multiplier are successively processed with each multiplier digit effecting the selection of a previously generated and stored multiple of the multiplicand. More specifically, the multiplication is effected by first introducing a multiplicand into an accumulator register, the latter being associated with an adder whereby selective multiples of the multiplicand are generated. The selective multiples, as generated, are transferred to, and stored in, a multi-channel storage unit. The multiplier is next introduced into a precessing register with a low-order hexadecimal digit thereof being transferred directly into a selector circuit for selecting the respective channels of the multiplicand storage unit associated with the respective multiplier digits. (As used herein, the term "precessing register" defines a continuously shifting register in the nature of that disclosed in Sections 2.4 and 15.4 of the book entitled "Digital Computer and Control Engineering" by R. S. Ledley, McGraw-Hill, 1960.) Logic means associated with the selector circuit are provided for generating, as required, the additional multiples of the multiplicand from those selective multiples previously generated and stored. The present invention is directed to a representative embodiment of the selector circuit utilized in the Daly apparatus for selecting the respective channels of the multiplicand storage unit associated with the respective multiplier digits.

In this respect, the successive digits of the multiplier are processed through the precessing register and the multiples of the multiplicand are selected, or generated, by means of the above-mentioned logic circuitry. To complete the operative cycle of the multiplication technique the selected, or generated, multiples of the multiplicand are transferred to the adder wherein they are added with other multiples similarly selected and applied during subsequent operative cycles.

As proposed for the multiplication apparatus constructed in accordance with the Daly apparatus, four binary coded hexadecimal multiples of the multiplicand, including the 1's multiple, are generated and stored in the multi-channel storage unit. The remaining multiples of the hexadecimal code are generated by a straight or shifted, and complemented or non-complemented transfer of the previously generated and stored multiples. (As used herein, the term "compliment" is to be interpreted as synonomous with the more often used form "complement," the former being of the form set out at page 168 of Webster's New Collegiate Dictionary, Second Edition, G. & C. Merriam Company, 1949.) Thus, by using the 1's multiple, it is possible to generate the 1's, 8's or 15's multiple of the multiplicand by a straight, shifted or straight complimented readout of the digital representations stored in the first word position of memory. The digital representations stored in the first word position of memory is also utilized when a carry, generated in a preceding operative cycle, is brought forward in conjunction with the generation of a 0, 7's or 14's multiple. A four-bit code is used to represent each of the hexadecimal digits, with an additional bit being used to indicate the presence or absence of a carry generated in the preceding operative cycle.

In considering the hardware necessary to condition the individual elements of a logical network required to effect the selection of the 1's multiple as stored in the first word position of the multi-channel storage unit, there would be required a minimum of thirty lines with associated logic to indicate the assertion or negation of each bit representation. Additional load lines and control circuitry would also be needed to enable the logical network to properly function.

The physical bulk of the above-outlined logical network would constitute a severe limitation on the operative speed and physical space requirements so important in the design of present-day module-type electronic data processing systems. In this respect, the number of wiring terminals available in a conventional module would immediately preclude the adaptation of the above-outlined system. Notwithstanding the terminal limitation, the physical loading of a logic circuit for implementing the above-outlined multiple selections would also prove to be prohibitive. In addition, the cable required to service the logic circuit would introduce time delays incompatible with the proposed operating speed of the Daly system. It is apparent from the above that the space and time considerations, plus the physical limitations, imposed on the circuitry would prohibit a straightforward approach to the implementation of the above-outlined logical network.

In the past, it has been known to construct a logic circuit which serves to reduce a group of signal representations of symmetrical logic statements into an equivalent signal representation of a single symmetrical logic statement which satisfies the logic requirements of the entire group. It is thus possible through the utilization of the symmetrical properties of these signal representations, to reduce appreciably the logic circuitry required, thereby correspondingly enhancing the operative speed and space requirements of the system. The utilization of the symmetrical properties of such signal representations is in part responsible for the increased efficiency of the present system. However, to be useful, the signal representations must first exhibit the desired symmetry with respect to one another. The signals representing the various possible coded representations effective in selecting the first word position of memory, as outlined above, do not exhibit the required symmetry so that, without modification, it is not possible to adapt presently known methods to effect the desired reduction in logic circuitry.

A particular advantage of the present invention is that it enables a plurality of signal representations of non-symmetric logic statements to be translated into new representations which do exhibit the desired symmetry with respect to one another so as to permit their generation using simplified logic circuits.

It is therefore a principal object of this invention to provide a data processing system which includes means by which a group of non-symmetric logic statements may be translated into a new set of logic statements which exhibit the required symmetry to permit them to be reduced to a further more simple logic statement.

In a preferred embodiment of the present invention, a plurality of EXCLUSIVE OR gates are provided with means connecting adjacent bit positions of a signal representation exhibiting non-symmetric characteristics to particular ones of said EXCLUSIVE OR gates whereby the outputs thereof exhibit the desired symmetry.

Thus, a more specific object of the present invention is to provide a new and improved logical circuitry including a plurality of EXCLUSIVE OR gates for transforming a non-symmetric signal representation into one exhibiting symmetrical properties.

Another more general object of this invention concerns a novel apparatus for sensing the multiple bits of a first operand and generating select signals therefrom such that a minimum amount of hardware is required to effect the sensing and generation of said select signals.

Still another object of this invention is to provide a new and improved multiplication apparatus including means for implementing the foregoing objects, which means comprise a minimum amount of hardware and which means are adapted to operate in a minimum time.

For a better understanding of the invention, its advantages and specific objects attained with its use, reference should be made to the accompanying drawings and descriptive matter in which there is illustrated and described a preferred embodiment of the invention.

Figure 1:
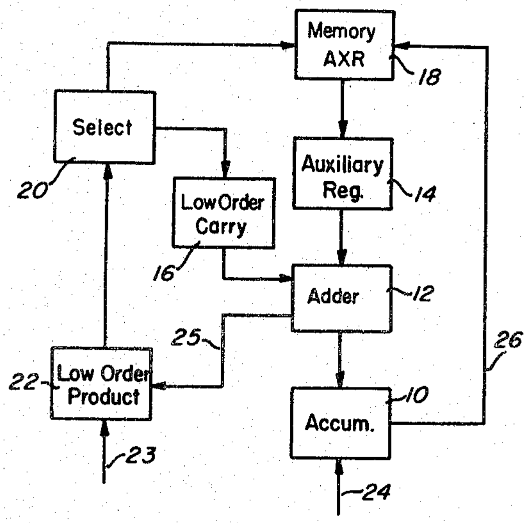
FIGURE 1 is a diagrammatic representation of the invention.

Referring first to FIGURE 1, therein is shown in diagrammatic fashion the basic element of an apparatus for multiplying a pair of binary coded hexadecimal numbers. The numeral 10 identifies an accumulator that serves as a multiplicand register into which the respective hexadecimal bits of a multiplicand are entered from a source, not shown. The multiplicand register 10 may take the form of a series of interconnected bistable flip-flops having appropriate coupling circuits between the stages so that the register may be operated in a serial fashion for the purpose of examining one or more digits in the register. A representative form of a serial register will be found in the copending application of Henry W. Schrimpf, bearing Ser. No. 636,256 and filed Jan. 27, 1957, now Patent No. 3,201,762. In the event that optimum speed of operation is a requirement, the multiplicand register and the associated circuitry hereinafter described may be operative in the parallel mode whereby the respective digits of the multiplicand are simultaneously examined, in which event the register may take the form for such registers as described in the text of R. K. Richards, entitled, "Arithmetic Operations in Digital Computers," D. Van Nostrand Co., 1955. Alternatively, the multiplicand and associated registers may be operative in the parallel-serial-parallel mode as illustrated in the invention of Roy W. Reach et al., bearing Ser. No. 843,719, filed Oct. 1, 1959, now Patent No. 3,003,695.

The multiplication apparatus further includes an adder circuit 12 which, in a preferred embodiment of this invention, takes the form of a 48-bit high-speed parallel binary adder capable of producing the binary sum of two 48-bit operands in one pulse period or 250 nanoseconds. An adder suitable for use herein may be such as is described in the copending application of Joseph F. Kruy, bearing Ser. No. 293,007 and filed July 5, 1963.

Also associated with the input of the adder is an auxiliary register 14 and a low-order carry generator 16. The auxiliary register 14 serves as a buffer register between a memory 18 and the adder 12, and may be of the type utilized as the multiplicand register referred to above. The low-order carry generator 16 is part of the control equipment necessary to the implementation of the various modes of operation of the present invention, and may consist of a single-shot device such as a one-shot multivibrator which, when actuated, produces an output signal of predetermined magnitude for a finite period of time before returning to its quiescent mode, alternatively, a bistable device may be set or reset to indicate the presence or absence of a low-order carry signal respectively; such devices are common in the data processing art as presently practiced. A further understanding of the function of the low-order carry generator 16 will best be appreciated from a description of a complete multiplication apparatus and the operation thereof which is discussed below. Continuing with the description of the circuitry illustrated in FIGURE 1, it should be noted that the basic system further includes address select means 20 associated with the memory 18 and the low-order digit portion of a multi-bit multiplier register 22 alternatively known as the low-order product register.

In a preferred embodiment of the present invention, the memory 18 comprises four words of storage, each word being 48 bits in length and coded in the hexadecimal representation so that each word contains twelve 4-bit digits. Each memory word has associated therewith logic circuitry which enables the digital representation stored therein to be read out in a straight or shifted, complimented or noncomplimented manner. By selectively using this logic circuitry, it is thus possible, through the use of a specific word from memory to form additional multiples of the word stored therein simply by shifting and/or complimenting the digital representation of the word. Before considering in detail the structural features of a preferred embodiment of the memory, a more complete understanding of the function and operation of the memory 18 is deemed necessary and will be more fully explained in connection with FIGURES 2, 2A and 4 which show in diagrammatic form the logical implementation of a preferred embodiment of the memory unit.

However, before going into the details of FIGURES 2, 2A and 4 as they concern the multiples generation and selection technique, a review of the operative mode of the above-outlined apparatus will first be made. In this respect, in the embodiment of FIGURE 1, a typical multiplication operation is initiated by introducing the multiplicand into the accumulator 10 via line 24. In a preferred embodiment of this invention, the multiplicand is introduced in a serial-parallel manner. Thus, three of the twelve hexadecimal digits are loaded in parallel in four successive or time-phase loading steps. After loading the multiplicand, and prior to the introduction of the multiplier, four selective multiples of the multiplicand are generated and stored in the assigned word locations of the memory 18. In one embodiment of the present invention, the selective multiples are generated by transferring the digital representation of the multiplicand into the register 14 from whence it is transferred into the adder 12 and added to the number previously stored in the accumulator. The added result is then restored in the accumulator 10. By repeating this operation through successive cycles, a complete table of multiples may be generated with selected ones of the generated table of multiples being transferred directly into selected locations in the memory 18 via load line 26. In a more sophisticated embodiment of the multiple-generation portion of the present invention, the selective multiples are generated and stored in a period of two microseconds.

With the multiples of the multiplicand stored, the accumulator 10 and register 14 are cleared and the multiplier is introduced into the low-order product register 22. The loading of the multiplier over line 23 into the register 22 may also proceed in the serial-parallel mode whereby three hexadecimal digits are loaded in each of four successive time-phased cycles. Simultaneous with the loading of the multiplier, the low-order digit of the portion of the multiplier being loaded during each of the four successive cycles is sensed directly by sensing means associated with select means 20 whereby a select order is sent to the storage unit 18 to effect the transfer of the appropriate multiple or representation thereof to the register 14. The multiple so selected remains temporarily in the register 14, whereafter it is added in the arithmetic unit 12 to information previously stored in the accumulator 10, this information being zero in the first addition cycle.

The resultant sum is transferred from the adder 12 and stored in the accumulator 10 except for the low-order digit thereof which is immediately shifted via line 25 into the high-order character position of the low-order product register 22. The high-order digit of the multiplier previously occupying this position is shifted one position left in accordance with the normal operation of the precessing type register. This completes one operative cycle in the multiplication process, successive multiplier bits being treated in this manner until all the multiplier digits have been processed.

As noted above, each storage position of the memory 18 has associated therewith a characteristic word shift wired therein with each bit position thereof having appropriate logic means to effect a readout in straight or shifted representation and additional means to compliment or not compliment the straight or shifted readout. Thus, the first word position has a characteristic 3-bit left shift; the second word position has a 2-bit left shift and the third and fourth word positions both have a 1-bit left shift.

In the preferred embodiment of the present invention, selective multiples of the multiplicand are generated and stored as soon as the A operand is received; this operation being effected simultaneously with the introduction of the B operand. In order to effect this operation, the multiplicand is loaded into memory word positions 1, 2 and 3. As set out above, the third memory word position has associated therewith a 1-bit left shift, thus a shift readout appears as a 2's multiple of the multiplicand. Adding this to the value stored in the accumulator 10 in successive cycles generates the 3, 5 and 7 multiples which, along with the previously available 1's multiple, are loaded into their appropriate word positions of memory 18 to provide the 1's, 3's, 5's and 7's multiple in the first, second, third and fourth word positions respectively. Once the selective multiples of the multiplicand have been generated and stored, additional multiples may be generated therefrom as required and in accordance with the select technique to be hereinafter described.

A direct shift readout operation is used to generate the 8, 10, 12 and 14 multiples of the multiplicand from the prestored multiplicand multiples of 1, 3, 5 and 7 respectively. Thus, in binary notation, the preestablished 3-bit left shift of 1's multiple in the first word position is equivalent in binary notation to multiplication by 8 so that, by logically performing such a shift, an 8's multiple of the prestored 1's multiple may be generated.

Similarly a 12's multiple of the multiplicand may be generated by shifting the 3's multiple of the multiplicand two places left. As an example for a multiplicand of 15, the 3's multiple, in straight binary notation, will appear as 101101. When this latter number is shifted left two places, the result appears as 10110100 which, when converted to decimal notation, appears as 180 which is 15 multiplied by 12.

The remaining multiples of the multiplicand are generated by taking the 2's compliment of the multiples generated by the shift readout or direct readout techniques. The 2's compliment of a binary coded number is formed by subtracting the number from all one bits and adding one to the low-order digit of the difference. The adding of the one to the difference is known as an end around borrow, and will hereinafter be referred to as a low-order compliment carry. The low-order compliment carry is one of two distinguishable carry signals generated in the carry signal generator 16 in response to a compliment signal from select means 20. The second carry signal is necessary to increment the succeeding multiplier digit after a compliment action has been taken and will henceforth be known as a low-order inter-digit carry signal.

Accordingly, a 2's multiple may be generated from a 7's multiple by a shift readout complimented. Thus, a 7's multiple of a binary coded decimal 1 appears as 0111 which, when shifted one place left, transforms into 1110. Forming the 2's compliment of the shifted representation results in the number 0010 which is the desired 2 multiple. Utilizing the shift readout complimented technique on the 3 and 5 multiples in the manner outlined above results in the generation of the 4 and 6 multiples respectively.

The 9's multiple of a binary number may be generated by a straight readout complimented operation on the 7's multiple of the binary number stored in the fourth word position of memory 18. For example, the 7's multiple of a binary one appears in hexadecimal form as 0111 which is subtracted from all ones in the first step of the complimenting operation resulting in the representation 1000. This transforms into the desired result of 1001 when the low-order compliment carry is allowed for. In a similar manner the 11, 13 and 15 multiples are generated by a straight readout complimented operation on the 5, 3 and 1 multiples respectively.

The basic operation of the circuitry illustrated and described hereinafter will best be understood by first considering an example of a typical mathematical operation to be performed. In this respect, assume that in a multiplication operation, a multiplicand of decimal value 111 is to be multiplied by a multiplier of decimal value 472. In accordance with the general operating features of the present invention, the 1, 3, 5 and 7 multiples of the multiplicand are first generated and then stored in memory 18 in binary coded hexadecimal form. After the generation and storage of the selective multiples have been effected, the processing of the multiplier digits begins.

The first multiplier digit to be processed is a 2. In accordance with the principles of the present invention, the generation of a 2's multiple is effected through a 7's multiple shift readout complimented operation. Thus, in binary coded hexadecimal notation, the 7's multiple of the multiplicand is represented as 0000 0000 0000 0111 0111 0111 which, when shifted left one bit position, appears as 0000 0000 0000 1110 1110 1110

In effecting the 2's compliment operation, the shifted representation is first subtracted from all 1's to give 1111 1111 1111 0001 0001 0001 which, when consideration is given to the low-order compliment carry, results in the hexadecimal representation

| | | | | | |
|---|---|---|---|---|---|
| 1111 | 1111 | 1111 | 0001 | 0001 | 0010 |
| (15) | (15) | (15) | (1) | (1) | (2) |

This number is added to the number already in the accumulator register 10 which, in the case of the processing of the first multiplier digit, is zero. The resultant sum is then restored in the accumulator register 10 with the exception of the low-order digit which is transferred directly into the high-order digit position of the low-order product register 22.

Since a compliment operation was performed in processing the first multiplier digit, an inter-digit carry signal is available to increment the succeeding multiplier digit. Thus, the second multiplier digit which appears in the example as a 7, is actually treated as an 8's multiple. In accordance with the operative routine of the preferred embodiment of the present invention as outlined above, an 8's multiple is generated by a 1's multiple shift readout non-complimented. The 1's multiple, in hexadecimal notation, is stored in the first word position of the memory 18 as 0000 0000 0000 0001 0001 0001

As previously noted, the first word position of memory 18 has an inherent 3-bit left shift so that a shifted representation of the 1's multiple appears as 0000 0000 0000 1000 1000 1000

This number is to be added to the portion of the number generated in the preceding cycle and stored in the accumulator register 10 as 1111 1111 1111 0001 0001

The addition is effected in adder 12 and results in the intermediate sum 0000 0000 0000 0111 1001 1001 which is restored in the accumulator register 10 except for the low-order digit, a decimal 9, which is transferred directly into the high-order character position of the precessing register 22.

Since the processing of the preceding multiplier digit did not involve a compliment operation, the third multiplier digit is processed as originally represented, that is, as a binary coded hexadecimal 4. In accordance with the preferred embodiment of the present invention, the 4's multiple is generated as a 3's multiple shift readout complimented. Following the routine established for the generation of the 2's multiple above, the hexadecimal representation of the 3's multiple, namely:

0000 0000 0000 0011 0011 0011 when shifted two bits left and complimented, transforms to 1111 1111 1111 0011 0011 0011

When this number is added to the number stored in the accumulator register 10, and taking into account the low-order compliment carry, there results the partial product 1111 1111 1111 0011 1010 1101

The resultant sum is then restored in the accumulator register 10 with the exception of the low-order digit, a decimal 13, which is transferred directly into the high-order character position of the precessing register 22. All of the multiplier digits have now been processed. However, since the processing of the preceding multiplier digit involved a compliment operation, a low-order inter-digit carry remains to be processed. Accordingly, the hexadecimal representation 0000 0000 0000 0001 0001 0001 is added to the number stored in the accumulator register 10 which results in the hexadecimal representation 0000 0000 0000 0100 1011

In accordance with the mode of operation established for the preferred embodiment of the present invention, this entire digital representation is stored in the accumulator register 10. These digits, along with those digits previously stored in the precessing register 22, constitute the final answer, namely:

| | | | | | | |
|---|---|---|---|---|---|---|
| 0000 | 0000 | 0100 | 1011 | 1101 | 1001 | 0010 |
| 0 | 0 | 4 | (11) | (13) | 9 | 2 |

This may be compared with the results obtained by a conventional multiplication routine expressed in hexadecimal form; namely:

| | | | | |
|---|---|---|---|---|
| | | 1 | 1 | 1 |
| | | ×4 | 7 | 2 |
| | | 2 | 2 | 2 |
| | 7 | 7 | 7 | |
| 4 | 4 | 4 | | |
| 4 | (11) | (13) | 9 | 2 |

Figure 2:
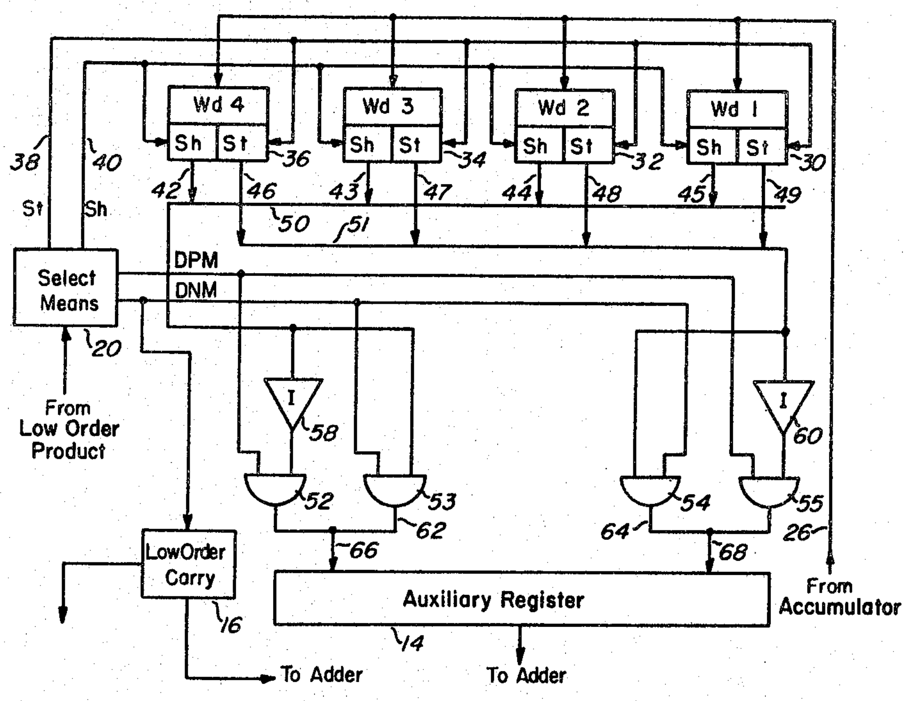
FIGURE 2 is a diagrammatic representation of a portion of FIGURE 1 with an elaboration on the details thereof.
Figure 2A:
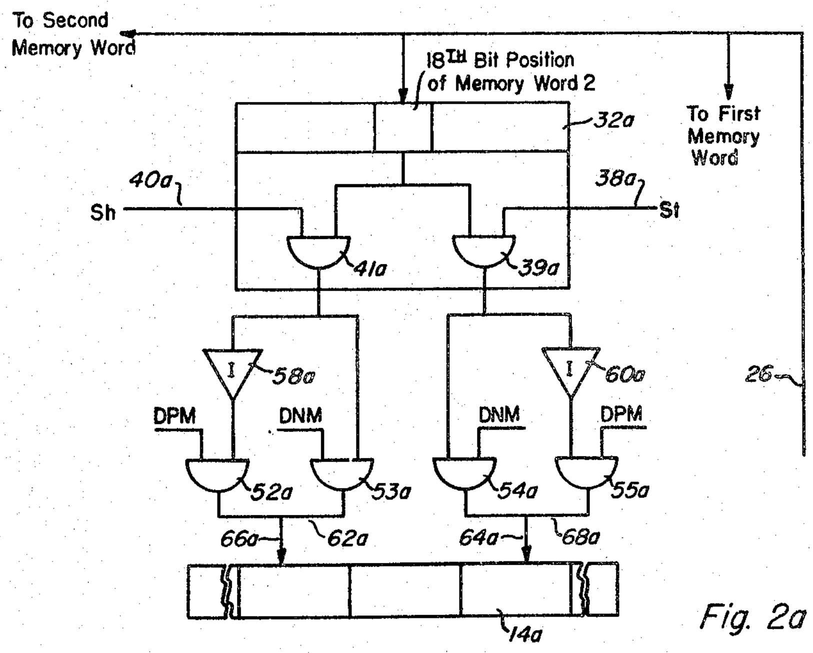
FIGURE 2A is a modification of FIGURE 2 with further elaboration on the details thereof.

Referring now to FIGURE 2, therein is shown in diagrammatic form the memory 18 of FIGURE 1. In accordance with the operation outlined above, the selective multiples as they are generated are fed via line 26 to storage locations represented as registers 30, 32, 34 and 36, corresponding in the described embodiment to memory words 1 through 4 respectively. Select means 20 is shown connected to control inputs on registers 30, 32, 34 and 36 via lines represented generally as 38 and 40. In the actual circuit each set of lines 38 and 40 represent means for effecting a straight or shifted readout of the digital representation stored in the associated memory register. Accordingly, a corresponding plurality of output lines 42 thru 49 are provided to transfer the straight or shifted representation out of the associated storage locations. These outputs are buffered through OR gates 50 and 51 respectively, the output of each being passed alternatively through associated circuitry to AND gates 52 or 53 and 54 or 55 respectively. The AND gates 52, 53, 54 and 55 are conditioned by signals DPM and DNM generated in the select means 20 which, among other things, determine whether the readout is to be transferred in a complimented or non-complimented manner. The signal DPM may be literally interpreted as "drop positive multiple"; while the term DNM may be similarly interpreted as "drop negative multiple." Included in the circuitry common to AND gates 52 and 55 are inverters 58 and 60, which effect the complimenting of the shifted or straight readout representation of the memory word when the associated AND gate 52 or 55 is conditioned by select means 20. Also associated with the outputs of AND gates 52, 53, 54 and 55 are OR gates 62 and 64, the outputs of which are connected via lines 66 and 68 to different locations within the register 14.

Although the memory unit is shown herein as being connected to the register 14 by means of a single pair of lines 66 and 68 in actual practice each bit position of every memory register has associated therewith separate gating means connected to the register 14 to permit a transfer of information in accordance with its characteristic word shift. Reference is made in this respect to FIGURE 2A which discloses the gating means associated with the 18th bit position of the second memory word.

In accordance with the mode of operation discussed in conjunction with FIGURE 2 as applied to the information stored in the 18th bit position of the second memory word, a straight readout of the information stored therein would be effected by conditioning of AND gate 39*a* by a straight readout signal generated in select means 20, and directed on line 38*a* to the second memory word position. From AND gate 39*a* the output signal is delivered to inverter 60*a*. The reason for the inversion of the straight readout signal is that a natural inversion of the signal is an inherent characteristic of the memory cell so that, to effect a straight readout, the signal must be reinverted. This method of operation should not be viewed as a limitation on the present invention since it is simply a matter of choice which dictates this mode of implementation.

From the inverter 60*a*, the output signal is gated through logical AND circuit 55*a*, the latter being conditioned by a non-compliment readout signal DPM generated in select means 20. Thereafter, the straight non-complimented signal representation of bit 18 of the second memory word is transferred through OR gate 64a via line 68a to the 18th bit position of the register 14a.

Alternatively, a straight readout compliment operation may be performed on the signal stored in the 18th bit position of the second memory word by generation of a compliment signal DNM in select means 20. The latter compliment signal is effective to condition AND gate 54a so that when AND gate 39a is properly conditioned by select means 20, a straight-compliment representation of the signal, as originally stored in memory unit 32a, will be transferred to the 18th bit position of the register 14.

A similar operation may be initiated to effect the transfer of a shift readout representation of the information stored in the 18th bit position of the second memory word. In this respect, a shift readout signal generated in select means 20, and directed on line 40a to the second memory word will condition AND gate 41a to thereby initiate an output signal therefrom indicative of the signal representation of the 18th bit position of the second memory word. From AND gate 41a the output signal is delivered to inverter 58a from whence the output signal is gated through logical AND circuit 52a, the latter being conditioned by a non-complement readout DPM signal generated in select means 20. Thereafter, the shifted non-complimented signal representation of bit 18 of the second memory word is transferred through OR gate 62a via line 66a to the 20th bit position of register 14. The characteristic 2-bit left shift of the second memory word effected the transfers of the signal representation from the 18th bit position of the second memory word to the 20-bit position in register 14.

A shift readout compliment operation is effected for the 18th bit position of the second memory word by generation within select means 20 of a shift readout conditioning signal to AND gate 41a and also a compliment conditioning signal DNM to AND gate 53a. Thus, the signal representation of the 18th bit position of the second memory word will be transferred therethrough to the 20th bit position of the register 14 in a shifted-complimented form.

In addition to conditioning AND gates 53 and 54 of FIGURE 2 for a complimented readout of the selected memory words, the compliment select signal is also effective to condition the low-order carry generator 16 of FIGURE 1, to effect the addition of a hexadecimal one in the adder.

Figure 3:
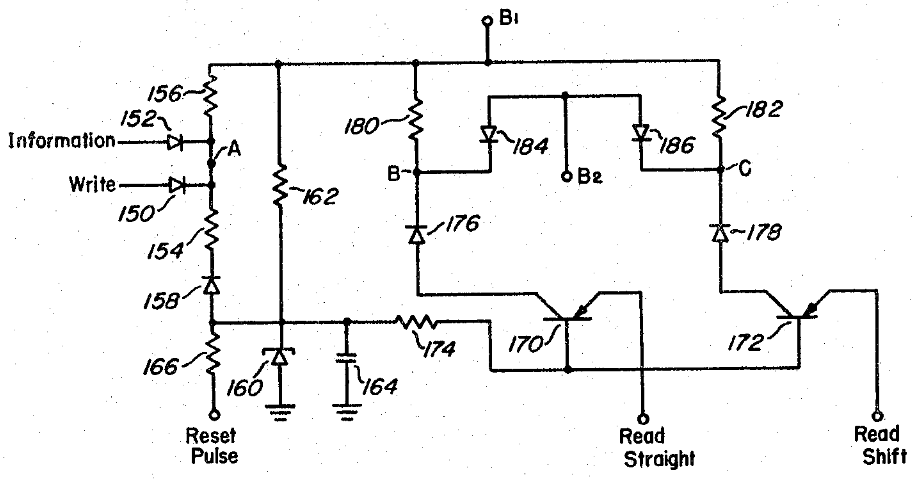
FIGURE 3 is a detailed circuit diagram of one practical embodiment of a memory cell and a portion of the logic utilized to implement the invention of FIGURES 1 and 2.

To complete the disclosure of the memory 18, reference is now made to FIGURE 3 which discloses what is in essence a basic memory cell of the memory unit as may be utilized in the preferred embodiment of the present invention. As noted above, each word of memory is comprised of a plurality of these memory cells corresponding to the bit locations of the multiplier digits comprising the respective memory words.

The input portion of the memory cell includes gating diodes 150 and 152 which are connected in an AND configuration and are conditioned to become operative upon concurrence of an information signal and a write signal from sources not shown. The information signal represents a particular bit value of a multiple of a multiplicand generated and stored in this memory cell in accordance with the teaching of this invention as outlined above.

Under normal operating conditions, and in the absence of coincident write and information signals, diodes 150 and 152 will be maintained in a forward-biased condition. Associated with point A common to the cathodes of diodes 150 and 152 are resistance members 154 and 156. Resistor 154 is connected to the cathode of an isolation diode 158 the anode of which is further connected to a tunnel diode 160 which is in turn grounded through its anode.

A biasing source terminal $B_1$ in combination with resistance member 162 maintains the tunnel diode 160 continuously operative in its low-voltage, high current state which will be considered as indicative of a binary zero in this particular application. Since the anode of the tunnel diode is at ground potential and the current drain is very low, the cathode will be maintained at essentially ground potential as well. In order to "set" the tunnel diode 160 to its high-voltage, low-current state, considered here to be indicative of a binary one, a coincidence of write and information pulses as applied to the anodes of diodes 150 and 152 must be established. As mentioned above, diodes 150 and 152 are normally forward-biased so that the anodes are held essentially at ground potential. This means that point A common to the cathodes of diodes 150 and 152 will also be essentially at ground potential, as is the potential at the cathode of the tunnel diode 160. If now negative signals are simultaneously applied to the anodes of diodes 150 and 152, the potential of point A will rise sufficiently to forward-bias diode 158, allowing a surge of current to pass through the tunnel diode 160, switching it into its high-voltage, low-current state.

If now the negative-going signals are removed from diodes 150 and 152, they will again become conductive so as to back-bias diode 158 below its threshold value; however, the tunnel diode 160 will remain in its second operative state. Capacitor 164 is provided to stabilize the switching of the tunnel diode and make it less responsive to transient signals generated internally of the circuit. A source of reset signals, not shown, is connected through resistor 166 to provide means for resetting the tunnel diode 160 to its first operating state after the completion of a select cycle.

The output portion of each memory cell includes transistors 170 and 172 which have their base electrodes connected in common through a parasitic suppression resistor 174 to the output of the tunnel diode 160. The emitter electrodes of transistors 170 and 172 are connected to "read straight" and "read shifted" drive lines respectively. The output legs of transistor 170 and 172 include their respective collector electrodes which are in turn connected through diodes 176 and 187, as well as resistance numbers 180 and 182, and thence to the biasing source $B_1$.

Straight or shifted output signals may be read off transistors 170 and 172 respectively at points B and C. These points are also common to a pair of clamping circuits consisting in part of diodes 184 and 186 and a second biasing source terminal B2. Diodes 184 and 186 of the clamping circuits are normally operative, thus holding points B and C at essentially a constant negative value established at terminal B2, thereby back-biasing diodes 176 and 178 so as to prevent spurious output signals. If now a read straight or read shifted signal is applied to either of the drive lines, and the tunnel diode 160 is in its second operative state, namely the high-voltage, low-current condition so as to bias sufficiently the base of transistors 170 and 172, diode 176 or 178 respectively will become forward-biased and an output signal will be generated on either the straight or shift output line.

As mentioned above, it is the function of select means 20 of FIGURE 1 to sense the low-order digit of the multiplier and in accordance with the nature of the signals so sensed to initiate the transfer of a signal representation from one of the words stored in storage unit 18. In this respect, reference is now made to FIGURE 4 which discloses in more specific detail the select means 20 of FIGURES 1 and 2. The logic circuitry of FIGURE 4 generates the desired select signals in accordance with the nature of the four binary coded hexadecimal bits of the low-order multiplier digit in the precessing register 22 in combination with a signal from flip-flop 77 representing a low-order inter-digit carry generated in carry generator 16 during the processing of the preceding multiplier digit.

As shown herein, the four low-order bits of the precessing register 22 are connected as inputs to associated EXCLUSIVE OR gates 70, 72, 74 and 76. The EXCLUSIVE OR gate is a well-known type of logic device which establishes an output signal when two input signals are of unlike sign. In the absence of any input signal, or in case both inputs are the same, no output is generated. For purposes of more clearly presenting the logic considerations involved in the generation of the various select signals, each EXCLUSIVE OR circuit is shown as having associated therewith a pair of output lines which carry one of two signal levels representing a one or a zero state, thereby indicating whether he gating conditions have been satisfied or not.

As noted above, the selection of the first word position of memory 18 will be effected whenever it is desired to generate a 1's, 8's or 15's multiple without an interdigit carry having been generated in the preceding operative cycle, and in the case of the 0, 7's and 14's multiple in the case where an interdigit carry has been generated in the preceding operative cycle. The various possible signal representations stored in the first word position of memory 18 may be expressed in terms of the following logic equations:

TABLE 1

| | |
|---|---|
| $\overline{A}\cdot\overline{B}\cdot\overline{C}\cdot D\cdot\overline{E}$ | $\overline{A}\cdot\overline{B}\cdot\overline{C}\cdot D\cdot E$ |
| 0 0 0 1 0 | 0 0 0 0 1 |
| $A\cdot\overline{B}\cdot\overline{C}\cdot\overline{D}\cdot\overline{E}$ | $\overline{A}\cdot B\cdot C\cdot D\cdot E$ |
| 1 0 0 0 0 | 0 1 1 1 1 |
| $A\cdot B\cdot C\cdot D\cdot\overline{E}$ | $A\cdot B\cdot C\cdot\overline{D}\cdot E$ |
| 1 1 1 1 0 | 1 1 1 0 1 |

In the above representation of Table 1, the letters A, B, C and D repersent the four low-order bits of the multiplier digit being processed, while the letter E is indicative of the interdiigt carry from the previously processed digit. In comparing the various signal representations, it is immediately apparent that they are all asymmetric with respect to each other. For purposes of this application, symmetry is herein defined as a property exhibited by two of the signal representations wherein all the bits save one are of common nature. The dissimilar bit common to both signal representations permits the original pair of signal representations to be replaced by a single signal representation reduced by the dissimilar bit. This follows since a selection made in accordance with the original signal representation would effectively be made independent of the nature of the dissimilar bit since in any event, both possible cases would be covered. An appreciable reduction in the hardware required to signal the selection of the digital representations stored in the first word position of the memory would be provided in the case where one or more of the various signal representations exhibited the desired symmetry.

Figure 4:
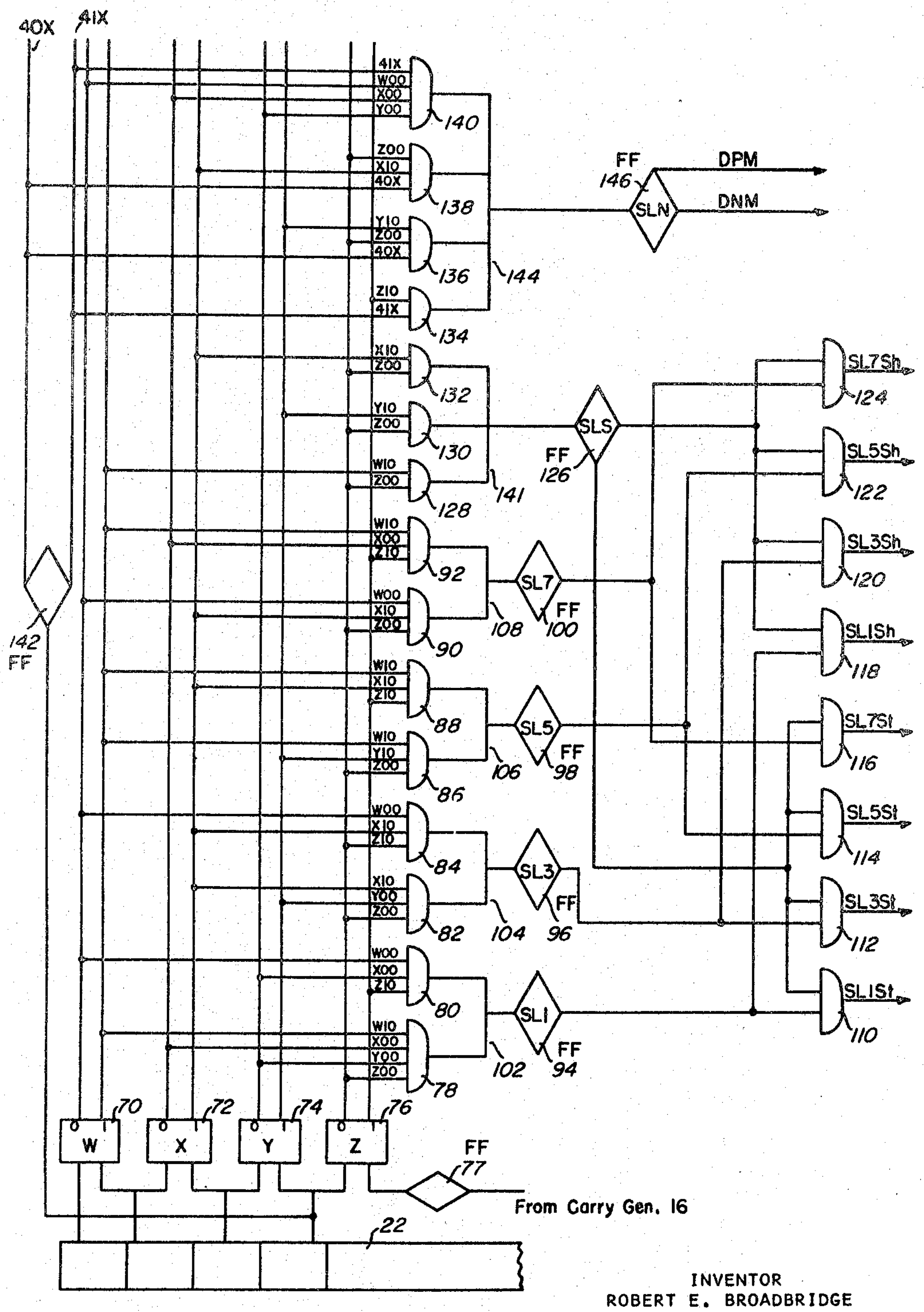
FIGURE 4 is a diagrammatic representation of the logic which may be used to implement the select means of FIGURES 1, 2 and 2A.

It is possible through utilization of the EXCLUSIVE OR circuitry of FIGURE 4 to transform the above set of non-symmetric signal representations into a new set of signal representations which do exhibit the desired symmetry. Thus, by combining adjacent bits of the non-symmetric signal representations in a particular one of the EXCLUSIVE OR gates of FIGURE 4, a single bit indicative of the relative nature of the original bits will be generated. The remaining bits of the original signal representation are treated in a similar manner to thereby complete the generation of the new signal representation. In like manner, the other original signal representations may be similarly translated to complete the set of new signal representations. In addition to being reduced by one bit, each of the signal representations also exhibits the desired symmetry with respect to one another, thereby permitting a further reduction in the logic necessary to effect the selection of the digital representation stored in the first word position of memory 18.

Referring once more to the signal representations of Table 1 and applying these as conditioning signals to the EXCLUSIVE OR gates of FIGURE 4, there results the following table of translated signal representations:

TABLE 2

| | |
|---|---|
| $\overline{W}\cdot\overline{X}\cdot Y\cdot Z$ | $\overline{W}\cdot\overline{X}\cdot\overline{Y}\cdot Z$ |
| $W\cdot\overline{X}\cdot\overline{Y}\cdot\overline{Z}$ | $W\cdot\overline{X}\cdot\overline{Y}\cdot\overline{Z}$ |
| $\overline{W}\cdot\overline{X}\cdot\overline{Y}\cdot Z$ | $\overline{W}\cdot\overline{X}\cdot Y\cdot Z$ |

In the above representation of Table 2, the letters W, X, Y and Z represent the combination of adjacent bit positions with the assertion or negation condition being established in accordance with the rules governing the conditioning of the EXCLUSIVE OR gates 70, 72, 74 and 76 as outlined above. Thus, allowing for duplication, and applying the definition of symmetry as outlined above, the original signal representations may now be expressed as the simple logic statement: $\overline{W}\,\overline{X}\,Z+W\,\overline{X}\,\overline{Y}\,\overline{Z}$. It is thus apparent that by utilizing the select logic of FIGURE 4 to effect the selection of the digital representations stored in the first word position of memory a reduction from 30 to 7 in the number of separate logic lines is realized.

Referring again to FIGURE 4, the output signals from the EXCLUSIVE OR gates 70, 72, 74 and 76 are selectively combined in AND gates 78, 80, 82, 84, 86, 88, 90 and 92 to thereby "set" flip-flops 94, 96, 98 and 100, the latter being connected to their associated AND gates through OR gates 102, 104, 106 and 108.

As a further example, consider the "setting" of flip-flop 94 corresponding to the selection of a 1's multiple of the multiplicand by proper conditioning of AND gate 78. In this case, it is required that the output of EXCLUSIVE OR gate 70 be of the 1 level corresponding to unlike bits in the first and second bit position of the low-order multiplier digit being scanned so that the alternative possible bit configurations 10 or 01 are established. This is represented in terms of a conditioning code at the input of AND gate 78 as W10. Referring now to a second conditioning lead of AND gate 78, there is shown in terms of the conditioning code the representation X00. This corresponds to a zero output level of the EXCLUSIVE OR gate 72 which is conditioned by the second and third bits of the low-order multiplier digit being processed. According to the code representation, the interpretation of X00 is such that if the second and third bits of the multiplier digit are alike, there will be an output to X00. Now, since conditioning of AND gate 78 is dependent upon the second and third bits of the low-order multiplier digit being alike, and since the second bit is also operative in the conditioning of the first EXCLUSIVE OR gate 70 wherein the permissive bit combinations were established as 10 and 01, the permissible combinations of the three bits are 011 and 100.

Similarly, the output of EXCLUSIVE OR gate 74 must be zero to establish the proper conditioning signal to AND gate 78 on input Y00. The dependence of the third bit of the multiplier digit in the conditioning of both EXCLUSIVE OR gates 72 and 74, and the fact that the output of EXCLUSIVE OR gate 76 will be zero if both the third and fourth bits of the multiplier digit are alike, limits the permissible combinations of the four bits of the multiplier digit to 0111 and 1000.

The final conditioning signal of AND gate 78 as applied on input Z00 is generated by a zero output from EXCLUSIVE OR gate 76 which is in turn predicated upon the sensing of a like condition existing between the fourth bit of the multiplier digit being sensed and the sensing of an interdigit carry from the processing of a preceding multiplier digit as stored in flip-flop 77.

The fact that a zero condition from EXCLUSIVE OR gate 76 will be generated if both the fourth bit of the multiplier digit and the interdigit carry signal from the preceding sensing cycle are the same, coupled with the interdependence of the fourth bit of the multiplier digit in EXCLUSIVE OR gates 74 and 76, limits the permissible combinations of input signals to the set of four EXCLUSIVE OR gates as 0111–1 and 1000–0.

Reconstructing, for purposes of further analysis, the representation W00 X00 Y00 Z00 as 0111 N or 1000 $\overline{N}$, N and $\overline{N}$ are to be interpreted as meaning that the interdigit carry was or was not propagated respectively in the processing of the preceding multiplier digit. In decimal notation, the expression 1000 $\overline{N}$ will thus be translated as an 8, while 0111 N will be translated as a 7 with an interdigit carry which signifies that the presently sensed 7 should be treated as an 8 insofar as the multiple selection is concerned.

The conditioning of AND gate 78 by the sensing of an 8 representation of the bits from the low-order multiplier digit or the equivalent 7 representation with an interdigit carry in the manner described is consistent with the technique outlined earlier for generating the various multiples of the multiplicand since the 8's multiple is generated as a shift readout non-complimented of the 1's multiple.

A 1's multiple select signal is also generated by proper conditioning of AND gate 80, which conditioning is effected in a manner similar to that established above by selective ones of the four bits of the low-order multiplier digit being processed and the presence or absence of a signal indicating an interdigit carry. As mentioned above, the output of AND gates 78 and 80 are buffered in OR gate 102 to effect the setting of the 1's multiple flip-flop 94. The output of the 1's multiple flip-flop 94, when set, is applied with a "straight" or "shift" signal, established in flip-flop 126 by its input logic including AND gate 128, 130 or 132. The conditioning of AND gates 128, 130 or 132 is effected in accordance with the sensing of selective ones of the multiplier bits.

The output of AND gates 128, 130 or 132 is buffered through OR gate 141 to set flip-flop 126 which is then effective in generating a shift readout signal which is combined with the select readout signal generated by flip-flops 94, 96, 98 or 100 in the AND gates 118, 120, 122 and 124. When flip-flop 126 is in its reset state, the select readout signal generated in flip-flops 94, 96, 98 or 100 is applied to one of the AND gates 110, 112, 114 or 116.

An additional consideration concerns the generation of a signal to effect the transfer of a positive or negative multiple, i.e. whether the selected multiple is to e transferred in straight or complimented manner. In this respect, AND gates 134, 136, 138 and 140 are conditioned to provide an output in accordance with the outputs of the EXCLUSIVE OR circuits 70, 72, 74 and 76 and the particular bit representation of the fourth bit of the low-order multiplier digit, as sensed by flip-flop 142. The output of AND gates 134, 136, 138 and 140 are gated through OR gate 144 to set, or reset, flip-flop 146 (SLN) thereby developing signals DNM or DPM respectively; these signals being used to operatively condition AND gates 50, 52, 54 or 56 of FIGURE 2.

Alternative arrangements for practicing the present invention suggest the implementation of the basic concept of multiples generation through combinations of straight or shift readout, complimented or non-complimented, with binary coded digital representations in octal form. An embodiment functioning in the octal mode requires only a pair of memory words and a corresponding lesser amount of hardware, the implementation of which is effected in the manner outlined above for the hexadecimal mode. In a suggested embodiment operative in the octal mode, the first word position of memory 18 would have wired therein a 2-bit left shift, while the second word positions would be characterized by a 1-bit left shift. In the practice in a multiplication operations of the embodiment operative in the octal mode, a 1's multiple of the multiplicand would be stored in the first word position of memory while the second word position would store the 3's multiple thereof.

In utilizing the above embodiment in the practice of a multiplication operation, a 1's multiple of the multiplicand would be stored in the first word position of memory, while the second word position would store the 3's multiple thereof. It would be possible to generate the 4's multiple by a 1's multiple shift readout non-complimented, while a 7's multiple would result from a 1's multiple straight readout complimented. In similar manner, a 6's multiple would result from a 3's multiple shift readout non-complimented, while a 2's multiple would be generated by a 3's multiple shift readout complimented. The remaining 5's multiple would be generated by a 3's multiple straight readout complimented.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. An electronic calculator comprising: a memory, means for temporarily storing a first multiple digit operand multiples generating and storing means for generating selective multiples of said multi-digit operand and for storing said selective multiples in said memory, means for temporarily storing a second multi-digit operand, means for successively processing the digits of said second multi-digit operand, each of said digits of said second multi-digit operand including a plurality of information bits, selection means for selecting a specific one of said previously generated and stored selective multiples, said selection means further comprising a plurality of logic gates, means connecting adjacent ones of said plurality of information bit positions of said second multi-digit operand to particular ones of said logic gates, means indicating the generation of particular ones of said selective multiples in a previous operating cycle, means for combining the output of said last named means with a signal representing a particular one of said plurality of information bit positions of said second multi-digit operand as inputs to one of said logic gates, and additional logic means connected to said multiples generating and storing means and actuated by an output from one of said logic gates to effect the transfer of a signal representation of a selected one of said previously generated and stored selective multiples in any one of a plurality of digital representations.

2. In combination with a data processing device, means for storing a first multi-digit operand, means for receiving a signal representation of said first multi-digit operand, means for storing a second multi-digit operand, each of the digits of said second multi-digit operand including a plurality of information bits, means for selecting said previously stored first multi-digit operand and for effecting the transfer of a signal representation thereof to said means for receiving said signal representation, said select means further comprising a plurality of logical devices, means connecting adjacent ones of said plurality of information bits of said second multi-digit operand to particular ones of said plurality of logical devices, means for storing an indication of a signal representation generated in a previous operating cycle, and means combining the output of said last-named means with the output of at least one of said information bit positions of said second multi-digit operand in one of said plurality of logical devices of said select means, and when activated said selected means being effective in transferring a signal representation of said stored signal representations in any one of a plurality of digital representations.

3. In a device according to claim 2 wherein said plurality of logical devices are comprised of EXCLUSIVE OR gates.

4. An electronic calculator including means for storing a first multi-digit operand, means for receiving a signal representation of said first multi-digit operand, first logic means for transferring said signal repersentation of said multi-digit operand from said storage means to said receiving means in a straight and non-complimented manner, second logic means for transferring said signal representation of said multi-digit operand from said storage means to said receiving means in a straight and complimented manner, third logic means transferring a signal representation of said multi-digit operand from said storage means to said receiving means in a shifted and non-complimented manner, fourth logic means for transferring said signal representation of said mult-digit operand from said storage means to said receiving means in a shifted and complimented manner, means for storing a second multi-digit operand, each of said digits of said second multi-digit operand including a plurality of information bits, means for selecting said previously stored first multi-digit operand and for effecting the transfer of a signal representation thereof to said means for receiving said signal representation, said select means further comprising a plurality of EXCLUSIVE OR gates, means connecting adjacent ones of said plurality of information bit positions of said second multi-digit operand to particular ones of said EXCLUSIVE OR gates, means for storing an indication of a signal representation generated during the preceding operating cycle, and means combining the output of said last-named means with at least one of said information bits of said second multi-digit operand whereby upon actuation of said select means a transfer of said signal representation to said means for receiving said signal representation will be effected through a particular one of said four logic means.

5. In a selective signaling apparatus, multi-position means for storing first and second signal representations, each of said first and second signal representations comprising a plurality of information bits, a first plurality of logic devices, means connecting adjacent ones of said plurality of information bit storage positions to said first multi-position storage means, a plurality of intermediate conductors connected as outputs to said first plurality of logic devices, a second plurality of logic devices, means operatively conditioning each of said second plurality of logic devices, said conditioning means being operatively connected to selective ones of said plurality of intermediate conductors, and output means operatively connecting said second plurality of logic devices with said multi-position storage means, whereby output signals representing selective multiples of the multi-bit signal representation stored in said second multi-position store are generated within selective ones of said output means in accordance with the nature of said first signal representation.

6. In a selective signaling apparatus, means for storing a signal representation of a non-symmetric logic statement, said non-symmetric signal representation including a plurality of information bit positions, a plurality of logical gating devices, means selectively connecting outputs from said means for representing said plurality of information bit positions to particular ones of said logical gating devices, a plurality of output conductors operatively connected with said plurality of logical gating devices, and means responsive to said plurality of bits of said non-symmetric logic statement to generate a symmetric logic statement on the output conductors connected to said plurality of logical gating devices.

7. In a selective signaling apparatus, means for storing a signal representation of a non-symmetric logic statement, said signal representation including a plurality of information bits, a plurality of EXCLUSIVE OR gates, means connecting adjacent ones of said plurality of information bit storage positions as inputs to particular ones of said EXCLUSIVE OR gates, a plurality of intermediate conductors connected as outputs to said plurality of EXCLUSIVE OR gates, a plurality of AND gates, means operatively conditioning each of said AND gates, said conditioning means being operatively connected to selective ones of said plurality of intermediate conductors, output lines associated with each of said AND gates, and further logic means associated with said output lines for selectively combining the signals thereon to thereby effect the transfer of a signal representation comprising a symmetric logic statement.

8. In combination with a data processing apparatus, means for storing a plurality of digital representations, means for effecting the selection of a particular one of said plurality of digital representations, said last-named means further comprising means for storing a multi-bit signal representation, a plurality of EXCLUSIVE OR gates, means connecting adjacent ones of said information bit positions of said multi-bit storage means to particular ones of said EXCLUSIVE OR gates, a plurality of intermediate conductors connected as outputs to said plurality of EXCLUSIVE OR gates, a plurality of AND gates, means operatively conditioning each of said AND gates, said conditioning means being operatively connected to selective ones of said plurality of intermediate conductors, output lines associated with each of said AND gates, said conditioning means being operatively connected to selective ones of said plurality of intermediate conductors, output lines associated with each of said AND gates, said output lines from said AND gates operatively connected to said means for storing said plurality of digital representations whereby a particular one of said plurality of digital repersentations will be transferred therefrom in accordance with the nature of the signal representations stored in said associated multi-bit storage means.

9. In combination with a data processing apparatus, first storage means for storing a plurality of multi-digit operands, second storage means for storing a multi-bit signal representation for effecting the selection of a particular one of said plurality of multi-digit operands, a plurality of logical devices of a first type, means connecting adjacent one of said multi-bit positions of said second storage means to particular ones of said logical devices of a first type, a plurality of logical devices of a second type, means selectively connecting said logical devices of a first type to said logical devices of a second type, and output means associated with said plurality of logical devices of a second type whereby output signals representing a selective multiple of the selected one of said multi-digit operands are generated within selected ones of said output means in accordance with the nature of said multi-bit signal representation.

References Cited by the Examiner

Ledley, R. S., Digital Computer and Control Engineering, N. Y., McGraw-Hill, 1960, page 583.

MALCOLM A. MORRISON, *Primary Examiner.*

I. FAIBAISH, M. J. SPIVAK, *Assistant Examiners.*